United States Patent
Gruneberg

(10) Patent No.: US 12,416,179 B2
(45) Date of Patent: Sep. 16, 2025

(54) RABBIT FENCE PANEL SYSTEM

(71) Applicant: Jean-Marc Edouard Albert Gruneberg, Fitchburg, WI (US)

(72) Inventor: Jean-Marc Edouard Albert Gruneberg, Fitchburg, WI (US)

(*) Notice: Subject to any disclaimer, the term of this patent is extended or adjusted under 35 U.S.C. 154(b) by 0 days.

(21) Appl. No.: 17/952,427

(22) Filed: Sep. 26, 2022

(65) Prior Publication Data
US 2024/0175289 A1    May 30, 2024

(51) Int. Cl.
*E04H 17/22* (2006.01)
*A01M 29/30* (2011.01)
*E04H 17/16* (2006.01)

(52) U.S. Cl.
CPC ............. *E04H 17/22* (2013.01); *A01M 29/30* (2013.01); *E04H 17/16* (2013.01); *E04H 17/163* (2013.01)

(58) Field of Classification Search
CPC ........ E04H 17/163; E04H 17/21; E04H 17/22
See application file for complete search history.

(56) References Cited

U.S. PATENT DOCUMENTS

| | | | | |
|---|---|---|---|---|
| 803,741 | A * | 11/1905 | Carlson | E04H 17/20 256/73 |
| 7,562,865 | B2 * | 7/2009 | Penning | E04H 17/163 256/65.14 |
| 7,676,926 | B2 * | 3/2010 | Langenwalter | E04H 12/2215 29/897.31 |
| 7,850,148 | B2 * | 12/2010 | Collins, IV | E04H 17/21 248/156 |
| 8,925,904 | B2 * | 1/2015 | Christoffer et al. | E04G 21/3223 182/113 |
| 9,133,645 | B2 * | 9/2015 | Toglia | E04H 17/1448 |
| 11,225,810 | B2 * | 1/2022 | Bacon | E04H 17/009 |
| 11,371,258 | B2 * | 6/2022 | Goodin | E04H 17/009 |
| 11,377,871 | B2 * | 7/2022 | Escure | E04H 17/22 |
| 2016/0362907 | A1 * | 12/2016 | Pinneri | E04H 17/163 |
| 2019/0017285 | A1 * | 1/2019 | Kain | E04H 17/08 |
| 2019/0085589 | A1 * | 3/2019 | McKinney | E04H 17/1439 |

* cited by examiner

*Primary Examiner* — Michael P Ferguson

(57) ABSTRACT

A fencing system provides correct spacing between each fence panel and prevents misalignment between the metal anchor rods and the vertical posts of the panel frame. Panels can be installed without tools, and allow vertical lift-up and removal of the panels without tools from the metal anchor rods where there is no room between the vegetation and the fence. The panel can be reinstalled without tools by inserting the vertical post of the panel frame over the metal anchor rod, and ensures correct spacing between each panel and prevents misalignment between the metal anchor rod and the vertical post of the panel frame.

1 Claim, 1 Drawing Sheet

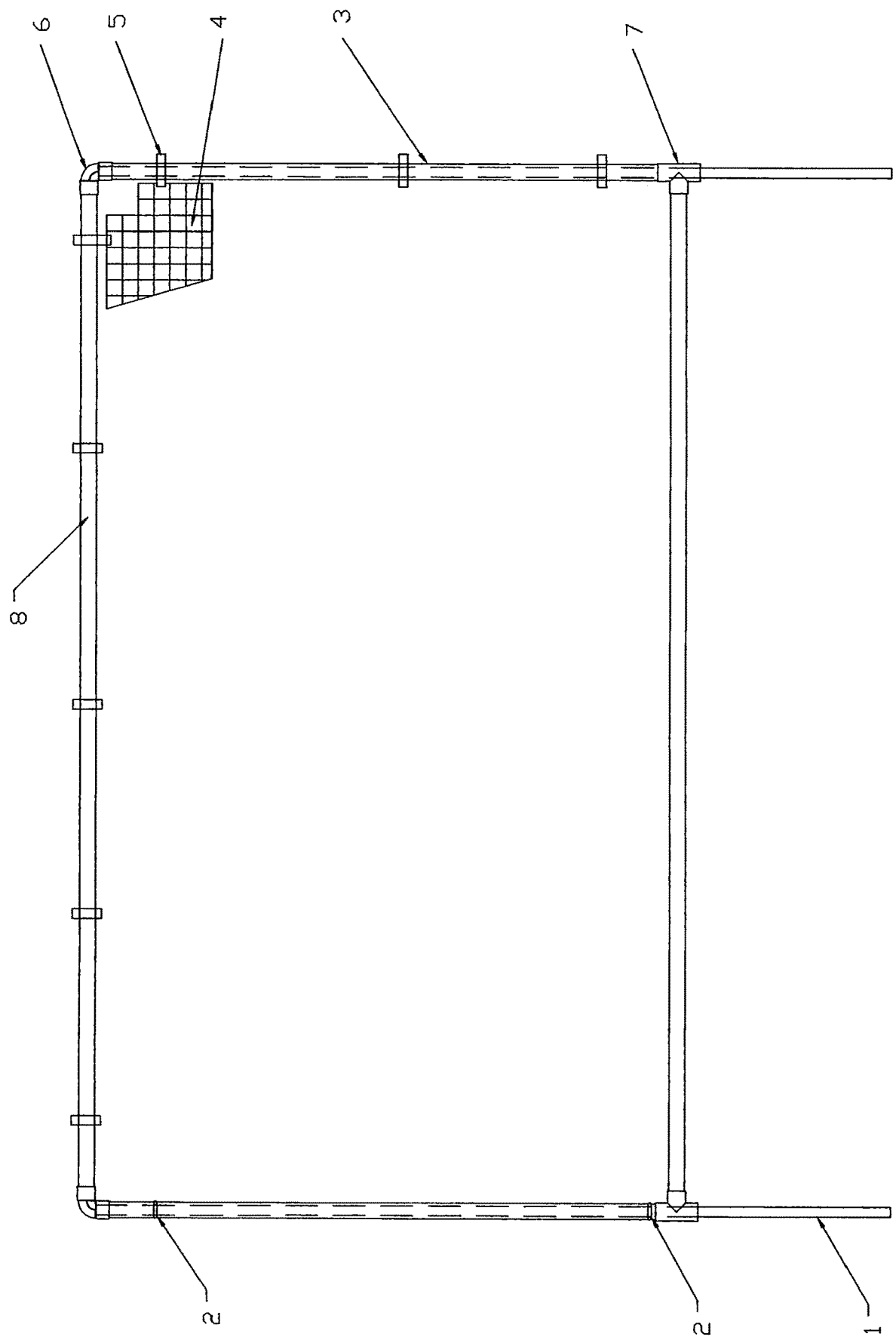

RABBIT FENCE PANEL SYSTEM

BACKGROUND

FIG.1. Is a perspective view of the fence panel assembly.

This invention is in the field of garden enclosures.

Traditionally chicken wire or plastic mesh is used with posts to produce an enclosure around gardens to prevent damage to the garden from pests such as rabbits. This invention provides pre-assembled panels which can be used to provide an enclosure. This invention is more flexible, more aesthetic, and can be installed without tools.

SUMMARY OF INVENTION

This invention pertains to a fencing system that provides correct spacing between each fence panel and prevents misalignment between the metal anchor rods and the vertical part of the panel frame.

Panels can be installed without tools.

If there is sufficient room between vegetation and fence panel, then a simple gate is provided.

This gate is a fence panel that swings on one metal anchor rod.

Engaging the other vertical part of the panel frame with a short metal anchor rod will hold the gate closed.

It allows the vertical lift-up and off of a fence panel, without tools, from the metal anchor rod to provide easy access to the vegetation, where there is no room between the vegetation and the fence panel.

The fence panel can then be easily reinstalled. A drawing "FPANEL" is provided for reference and shows the construction of each fence panel as well as the metal anchor rods to support the panels.

A DETAILED DESCRIPTION

For each panel there are two metal anchor rods 1.

Each metal anchor rod is equipped with two O-rings 2.

The metal anchor rods 1 with the two O-rings 2 will be inserted into the vertical part of the panel frame 3.

The 90 degrees elbow couplers 6 connecting the vertical panel post or part of the frame 3 with the horizontal rail or tee couplers part of the panel frame 8

The tee's 7 connecting the vertical panel part of the frame 3 with the horizontal part of the frame 8 and creating an opening for the metal anchor rods 1 on the bottom the fence panel.

A mesh material 4 is stretched in the panel frame and held by a series of stainless-steel zip ties 5.

The metal anchor rod 1 will be restrained by the 90-degree elbow 6 at the top of the panel frame.

The O-ring 2 friction will keep the metal anchor rod 1 from falling out of the vertical part of the panel frame 3.

The two metal anchor rods 1 inserted into the vertical part of the panel frame 3 will ensure correct spacing between each panel, and prevent misalignment between the metal anchor rod and the vertical part of the panel frame 3

Panel can be installed by hand while pushing down on top of the 90-degree elbows 6.

The friction of the o rings 2 will allow installation of the panel without tools and ensures correct spacing between each panel, preventing misalignment between the metal anchor rod 1 and the vertical part of the panel frame 3.

If there is sufficient room between vegetation and fence panel, then a simple gate is provided.

This gate is a fence panel that swings on 1 metal anchor rod.

Engaging the other vertical part of the panel frame with a short metal anchor rod will hold the gate closed.

This invention allows the vertical lift-up and off of a fence panel, without tools, from the metal anchor rod to provide easy access to the vegetation, where there is no room between the vegetation and the fence panel.

The panel can then be reinstalled by inserting the vertical part of the panel frame 3 over the metal anchor rod 1. This is done without tools and ensures correct spacing between each panel and prevents misalignment between the metal anchor rod 1 and the vertical part of the panel frame 3.

I claim:

1. A rabbit fence panel system which can be installed without tools, for vegetable and flower gardens, comprising a plurality of panels, each panel comprising:
   two cylindrical metal anchor rods each equipped with two O-rings, one of the O-rings disposed on the anchor rod adjacent an upper end thereof and the other O-ring disposed on the anchor rod adjacent a lower end thereof;
   a fence panel frame comprising a pair of upper and lower tubular horizontal rails and two opposing tubular vertical posts;
   two 90-degree elbow couplers and two tee couplers connecting the horizontal rails and the vertical posts, wherein each elbow coupler comprises a vertical tubing receiving an upper end of one of the vertical posts and a horizontal tubing receiving an end of the upper horizontal rail, wherein each tee coupler comprises a vertical tubing receiving a lower end of one of the vertical posts and a horizontal tubing receiving an end of the lower horizontal rail, and wherein the vertical tubing of each tee coupler comprises an opening at the intersection with the horizontal tubing for receiving one of the anchor rods therethrough;
   a mesh panel material;
   a series of stainless-steel zip ties coupling the mesh panel material to the vertical posts and the horizontal rails;
   wherein the anchor rods with the O-rings are inserted through the vertical tubing of the elbow couplers into the vertical posts and are engaged and restrained by the start of the 90-degree elbow couplers at a top of the panel frames,
   wherein the friction between the O-rings and an inner surface of the vertical posts keeps the anchor rods from falling out of the vertical posts prior to installation of the anchor rods into the ground;
   wherein pushing down by hand on the 90-degree elbow couplers moves the anchor rods into the ground, allowing installation of the panel without tools and ensuring correct spacing between each panel, and preventing misalignment between the anchor rods and the vertical posts;
   wherein the friction between the O-rings and the inner surface of the vertical posts allows vertical lift-up and removal without tools of the vertical posts and panel from the installed anchor rods to provide easy access to vegetation, where there's no room between the vegetation and the panels; and
   wherein the panel can be reinstalled without tools by inserting the vertical posts over the anchor rods, ensuring correct spacing between each panel and preventing misalignment between the anchor rods and the vertical parts.

\* \* \* \* \*